UNITED STATES PATENT OFFICE.

ALEXANDER N. DUBOIS, OF PHILADELPHIA, PENNSYLVANIA.

MORDANT FOR ANILINE-BLACK.

SPECIFICATION forming part of Letters Patent No. 287,112, dated October 23, 1883.

Application filed July 2, 1883. (No specimens.)

*To all whom it may concern:*

Be it known that I, ALEXANDER N. DUBOIS, a citizen of the United States, residing at Philadelphia, in the county of Philadelphia and State of Pennsylvania, have invented certain new and useful Improvements in Process of Dyeing Aniline-Black, of which the following is a specification.

My invention relates to an improvement in process of dyeing aniline-black; and it consists in the combination of certain ingredients whereby a mordant is produced, and which mordant is specially applicable to the dyeing-bath for which I have now an application pending for a patent, which application was filed April 14, 1883.

In the preparation of this mordant I take eighty parts of water, and in it dissolve fifteen parts of hydrochloric acid of 22° Baumé, and then add to it forty-five parts sulphate of soda and fifteen parts bichromate of potash. The whole is dissolved by boiling, and the boiling is permitted to continue from ten to fifteen minutes after dissolution has taken place. The liquid is then kept in a cool place, which should have a temperature of from 40° to 45° Fahrenheit, until crystallization has taken place, and after complete crystallization has taken place I separate the crystals from the mother-water, dry them in cold air, pack in well-covered jars and keep in a temperate place. The mother-water is kept for succeeding operations, because it always furnishes an additional quantity of crystals. This mordant is to be added to the dyeing-bath, which will consist of about eight hundred per cent. of tepid water, eight per cent. of aniline-salt, four per cent. of hydrochloric acid at 22° Baumé, eight per cent. of sulphuric acid at 66° Baumé, twelve per cent. of the mordant above described, and eight per cent. bichromate of potash. This bath is then thoroughly moved or stirred, and the article to be dyed is placed in it and moved around or worked from forty to fifty minutes, then taken out, washed well in cold water, and dried and finished in the usual manner. This bath, with the mordant added to it, is specially adapted for dyeing wood, bone, or vegetable ivory.

In treating these substances they are to be treated in the same manner as fabrics, with the exception that I employ from one hundred to one hundred and fifty per cent. of water, instead of eight hundred per cent., as there is not so much of the bath necessary. Before the wood, bone, or vegetable ivory are subjected to the bath they must be prepared for it beforehand. In order to prepare them, I place them in a solution containing about three per cent. of the mordant to one hundred to one hundred and fifty per cent. of the weight of the wood, bone, or vegetable ivory of cold water. The wood, bone, or vegetable ivory are allowed to remain in this bath for twenty-four hours, during which time they are stirred from time to time, then taken out, and without washing are placed in the dyeing-bath given above. Unless the bone, wood, or ivory are thus prepared beforehand they will not be dyed black, but merely colored. After the bone, wood, or vegetable ivory have remained in the dyeing-bath from forty to fifty minutes they are taken out, washed in cold water, and dried in the air, care being taken to protect them from sunshine, which causes scales. No boiling of the wood, bone, or ivory should take place before they are subjected to the bath.

This mordant above described is specially adapted for use in dyeing aniline-black, and it is in this connection that it is here specially claimed.

I do not limit myself to the proportions specified above, as they may be varied to suit the different requirements of the different substances to be dyed.

Having thus described my invention, I claim—

A mordant composed of water, hydrochloric acid, sulphate of soda, and bichromate of potash, as described.

In testimony whereof I affix my signature in presence of two witnesses.

A. N. DUBOIS.

Witnesses:
F. A. LEHMANN,
H. B. ZEVELY.